(12) United States Patent
Fukui et al.

(10) Patent No.: US 7,197,176 B2
(45) Date of Patent: Mar. 27, 2007

(54) MARK POSITION DETECTING APPARATUS AND MARK POSITION DETECTING METHOD

(75) Inventors: Tatsuo Fukui, Kawasaki (JP); Tomoaki Yamada, Yokohama (JP); Hirofumi Arima, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 778 days.

(21) Appl. No.: 10/461,443

(22) Filed: Jun. 16, 2003

(65) Prior Publication Data

US 2004/0114792 A1    Jun. 17, 2004

(30) Foreign Application Priority Data

Jun. 17, 2002    (JP)    ............................. 2002-175554

(51) Int. Cl.
*G06K 9/00* (2006.01)

(52) U.S. Cl. ........................................ 382/141; 382/151

(58) Field of Classification Search ................ 382/141, 382/146–147, 151, 274–275, 291, 294; 348/243, 348/247

See application file for complete search history.

(56) References Cited

U.S. PATENT DOCUMENTS

| | | | | |
|---|---|---|---|---|
| 4,281,342 A | * | 7/1981 | Ueda et al. .................... | 348/94 |
| 4,887,125 A | * | 12/1989 | Hideshima .................... | 355/55 |
| 5,293,239 A | * | 3/1994 | Takahashi et al. ........... | 348/241 |
| 5,812,703 A | * | 9/1998 | Juen et al. .................... | 382/274 |
| 6,664,121 B2 | * | 12/2003 | Grodnensky et al. ......... | 438/16 |
| 6,763,142 B2 | * | 7/2004 | Dai et al. ..................... | 382/260 |

FOREIGN PATENT DOCUMENTS

| | | |
|---|---|---|
| JP | A 6-189200 | 7/1994 |
| JP | A 6-197285 | 7/1994 |
| JP | A 7-15632 | 1/1995 |
| JP | A 7-253360 | 10/1995 |
| JP | A 11-351848 | 12/1999 |
| JP | A 2000-21738 | 1/2000 |

* cited by examiner

*Primary Examiner*—Daniel Miriam
(74) *Attorney, Agent, or Firm*—Oliff & Berridge, PLC

(57) ABSTRACT

A mark position detection apparatus includes: an illumination unit that illuminates a substrate having a mark formed thereupon; an image-capturing unit that captures an image of the substrate by using reflected light from the substrate and outputs image signals; a storage unit at which information related to fixed pattern noise contained in the image signals output by the image-capturing unit is stored in memory; and a control unit that calculates a position of the mark on the substrate based upon the information related to the fixed pattern noise stored in memory at the storage unit and the image signals output from the image-capturing unit.

10 Claims, 4 Drawing Sheets

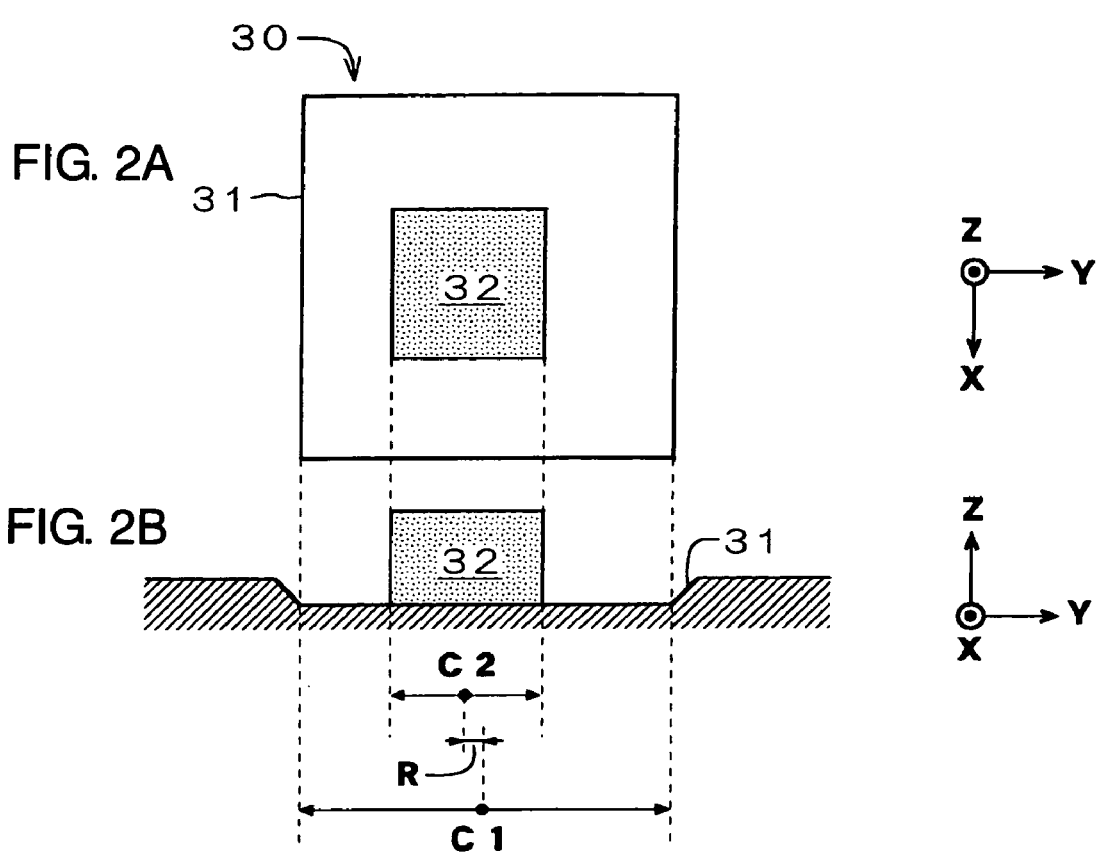

MARK POSITION DETECTING APPARATUS AND MARK POSITION DETECTING METHOD

INCORPORATION BY REFERENCE

The disclosures of the following application is herein incorporated by reference: Japanese Patent Application No. 2002-175554 filed Jun. 17, 2002.

BACKGROUND OF THE INVENTION

1. Field of the Invention

The present invention relates to a mark position detecting apparatus and a mark position detecting method to be adopted in the detection of the position of a inspection mark on a substrate and, more specifically, it relates to a mark position detecting apparatus and a mark position detecting method ideal for a highly accurate position detection which may be performed during the process of manufacturing semiconductor elements or the like.

2. Description of the Related Art

As is known in the related art, when manufacturing a semiconductor element or a liquid crystal display element, a circuit pattern (resist pattern) is transferred onto a resist film through an exposure step during which the circuit pattern formed at a mask (reticle) is imprinted on the resist film and a development step during which exposed portions or unexposed portions of the resist film are dissolved. Then, by performing etching, vapor deposition or the like with the resist pattern acting as a mask (processing step), the circuit pattern is transferred onto a film constituted of a specific material set below adjacent to the resist film (pattern formation process).

Next, a similar pattern formation process is repeated in order to form another circuit pattern over the circuit pattern formed at the film constituted of the specific material. By repeatedly executing the pattern formation process numerous times, circuit patterns transferred onto films constituted of various materials are laminated on the substrate (a semiconductor wafer or a liquid crystal substrate), and thus, a semiconductor element circuit or a liquid crystal display element circuit is formed.

During the manufacturing process described above, the mask and the substrate are aligned with each other prior to the exposure step in each pattern formation process so as to ensure that the circuit patterns at the films constituted of various materials are registered with precise alignment. In addition, the state of the registration of the resist pattern on the substrate is inspected after the development step and prior to the processing step so as to improve the product yield.

It is to be noted that during the alignment of the mask and the substrate (executed prior to the exposure step), the circuit pattern on the mask and the circuit pattern formed on the substrate through the immediately preceding pattern formation process are aligned with each other. This alignment is executed by using alignment marks indicating reference positions of the individual circuit patterns.

In addition, during the inspection of the state of the registration of the resist pattern on the substrate (executed prior to the processing step), the state of registration of the resist pattern relative to the circuit pattern formed through the immediately preceding pattern formation process (hereafter referred to as a "base pattern") is inspected. This registration state inspection is executed by using registration marks indicating reference positions of the base pattern and the resist pattern.

The position of such an alignment mark or registration mark (collectively referred to as a "inspection mark") is detected based upon the brightness distribution of image signals obtained by positioning the inspection mark within the visual field range of the apparatus and capturing the reflected image of the inspection mark with an image-capturing element such as a CCD camera. The brightness distribution in the image signals is constituted of brightness information provided in units of the individual pixels at the image-capturing surface of the image-capturing element.

In the related art described above, the position of the inspection mark is detected based upon the brightness distribution in the image signals provided by the image-capturing element and also, a registration measurement value is obtained through measurement. However, there is a problem with the related art technology in that the results of the positional detection and the results of the measurement of the registration measurement value fluctuate depending upon the actual positioning point of the inspection mark within the visual field range of the apparatus. This leads to a concern for low repeatability in that matching results cannot be achieved from a positional detection and a registration measurement executed for a given inspection mark if the positioning point for the inspection mark within the visual field range is not consistent.

The phenomenon is considered to be attributable to fixed pattern noise from optical systems or the image-capturing element remaining in the image signals. The problem discussed above has become more prevalent as inspection marks with a smaller stage height have become increasingly common in recent years, since the contrast of the brightness distribution in image signals obtained from a inspection mark with a reduced stage height is lower and is more likely to be affected by the fixed pattern noise.

SUMMARY OF THE INVENTION

The present invention provides a mark position detecting apparatus and a mark position detecting method that achieve mark position detection that is free of the adverse effect of fixed pattern noise.

A mark position detection apparatus according to the present invention, comprises: an illumination unit that illuminates a substrate having a mark formed thereupon; an image-capturing unit that captures an image of the substrate by using reflected light from the substrate and outputs image signals; a storage unit at which information related to fixed pattern noise contained in the image signals output by the image-capturing unit is stored in memory; and a control unit that calculates a position of the mark on the substrate based upon the information related to the fixed pattern noise stored in memory at the storage unit and the image signals output from the image-capturing unit.

In this mark position detecting apparatus, it is preferred that: the control unit measures in advance the fixed pattern noise by using a reference member having known reflection characteristics, the illumination unit and the image-capturing unit and stores the information related to the fixed pattern noise into the storage unit in advance based upon measurement results. In this case, it is preferred that: the image-capturing unit includes an image-capturing element comprising a plurality of pixels; and the control unit obtains average brightness information indicating an average brightness among substantially all the pixels and brightness information at the individual pixels based upon image signals generated by capturing an image of the reference member in advance, generates corrective brightness information for the individual pixels based upon the average brightness information and the brightness information corresponding to the individual pixels thus obtained, stores the corrective brightness information thus generated for the individual pixels into the storage unit in advance as the information related to the fixed pattern noise and corrects brightness information corresponding to the individual pixels indicated by the image signals obtained when the image of the substrate having the mark formed thereupon is captured by using the corrective brightness information for the individual pixels stored in advance at the storage unit.

Also, it is preferred that: the control unit corrects the image signals based upon the information related to the fixed pattern noise and calculates the position of the mark based upon edge information in a brightness distribution indicated by the corrected image signals.

A mark position detecting method according to the present invention, comprises: an illumination step in which a substrate having a mark formed thereupon is illuminated; an image-capturing step in which an image of the substrate is captured by using reflected light from the substrate and image signals are output; and a calculation step in which a position of the mark on the substrate is calculated based upon information related to fixed pattern noise contained in the image signals stored in memory in advance at a storage unit and the image signals output from the image-capturing unit.

In this mark position detecting method, it is preferred that: there is further provided a measurement step in which the fixed pattern noise is measured in advance by using a reference member having known reflection characteristics, an illumination unit utilized in the illumination step and an image-capturing unit utilized in the image-capturing step and the information related to the fixed pattern noise is stored in advance into the storage unit based upon measurement results. In this case, it is preferred that: the image-capturing unit includes an image-capturing element comprising a plurality of pixels; during the measurement step, average brightness information indicating an average brightness among substantially all the pixels and brightness information corresponding to the individual pixels are obtained based upon image signals generated by capturing an image of the reference member, corrective brightness information is generated for the individual pixels based upon the average brightness information and the brightness information corresponding to the individual pixels thus obtained and the corrective brightness information for the individual pixels thus generated is stored into the storage unit as the information related to the fixed pattern noise; and during the calculation step, brightness information at the individual pixels indicated by the image signals obtained when the image of the substrate having the mark formed thereupon is captured is corrected by using the corrective brightness information for the individual pixels stored in the storage unit.

Also, it is preferred that: during the calculation step, the image signals are corrected based upon the information related to the fixed pattern noise and the position of the mark is calculated based upon edge information in a brightness distribution indicated by the corrected image signals.

It is preferred that the above reference member is a mirror-finished wafer.

BRIEF DESCRIPTION OF THE DRAWINGS

FIGS. 1A and 1B show the overall structure adopted in the registration measuring apparatus 10;

FIG. 2A is a plan view of a registration mark 30 formed at the wafer product 11;

FIG. 2B is a sectional view of the registration mark 30 formed at the wafer product 11;

DESCRIPTION OF THE PREFERRED EMBODIMENT

The following is a detailed explanation of an embodiment of the present invention, given in reference to the drawings.

In reference to this embodiment, an example in which the mark position detecting apparatus according to the present invention is adopted in a registration (alignment) measuring apparatus 10 shown in FIG. 1 is explained. The registration measuring apparatus 10 is utilized to inspect a wafer having a resist pattern formed thereupon through a development step executed after transferring the pattern onto the resist with, for instance, a semiconductor exposure apparatus.

Figure 1A:
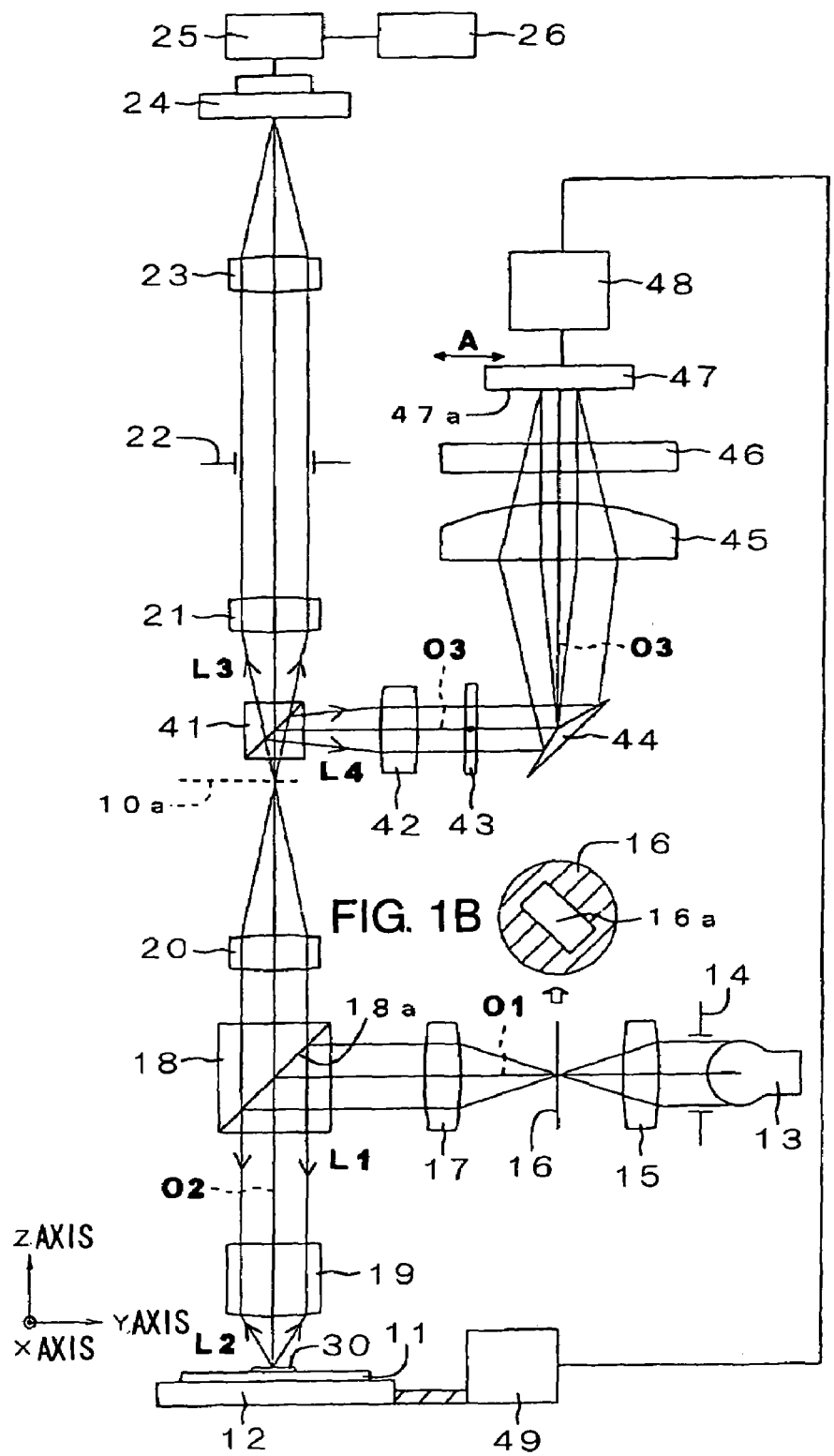

As shown in FIG. 1A, the registration measuring apparatus 10 comprises an inspection stage 12 which supports a wafer product 11 (or a mirror-finished wafer that is not shown), an illuminating optical system (13~18) which emits illuminating light L1 toward the wafer product 11 (or the mirror-finished wafer) on the inspection stage 12, an image forming optical system (19~23) which forms an image of the wafer product 11 (or the mirror-finished wafer) illuminated with the illuminating light L1, a CCD image-capturing element 24, an image processing device 25, a storage device 26, a focal point detection device (41~48) and a stage control device 49.

Before explaining the registration measuring apparatus 10 in more specific terms, the wafer product 11 and the mirror-finished wafer are described.

A plurality of circuit patterns (none shown) are laminated on the surface of the wafer product 11. The circuit pattern at the uppermost layer is a resist pattern transferred onto a resist film. Namely, the wafer product 11 is undergoing the process of forming another circuit pattern (after the resist film is exposed and developed and before the film constituted of a specific material is etched) over the base pattern formed through the immediately preceding pattern formation process.

The state of registration of the resist pattern relative to the base pattern at the wafer product 11 is inspected by utilizing the registration measuring apparatus 10. Accordingly, a registration mark (see FIGS. 2A and 2B) to be used in the registration state inspection is formed at the wafer product 11. FIG. 2A is a plan view of the registration mark 30 and FIG. 2B is its sectional view.

As shown in FIGS. 2A and 2B, the registration mark 30 is constituted of a base mark 31 and a resist mark 32 formed in rectangular shapes of different sizes. The base mark 31, which is formed concurrently while the base pattern is formed, indicates the reference position of the base pattern. The resist mark 32, which is formed concurrently while the resist pattern is formed, indicates the reference positions of the resist pattern. In this example, the base mark 31 is an outer mark and the resist mark 32 is an inner mark.

It is to be noted that although not shown, a film constituted of a specific material that is to be processed, is formed between the resist side where the resist mark 32 and the resist pattern are present and the base side where the base mark 31 and the base pattern are present. After the registration state is inspected by utilizing the registration measuring apparatus 10, this material film is actually processed via the resist pattern if the resist mark 32 is accurately registered relative to the base mark 31 and thus, the resist pattern is registered accurately relative to the base pattern.

Unlike the wafer product 11 described above, the mirror-finished wafer, which is a wafer achieving known reflection characteristics at its surface does not include any circuit pattern or registration mark 30 (see FIGS. 2A and 2B) having varying heights formed at the surface. The mirror-finished wafer used in the embodiment should achieve a uniform reflectance distribution at the surface which is also free of any adherent such as dust or dirt. This mirror-finished wafer is utilized when measuring the fixed pattern noise (to be detailed later) at the registration measuring apparatus 10.

Next, a specific structure adopted in the registration measuring apparatus 10 (see FIG. 1A) is explained.

Although not shown, the inspection stage 12 is constituted with a holder that supports the wafer product 11 (or the mirror-finished wafer) by holding it level, an XY drive unit that drives the holder along the horizontal direction (the XY directions) and a Z drive unit that drives the holder along the vertical direction (the Z direction). The XY drive unit and the Z drive unit are connected to the stage control device 49 to be described later.

It is to be noted that the wafer product 11 is placed on the holder at the inspection stage 12 when conducting a registration inspection for the wafer product 11 (when inspecting the state of registration of the resist pattern relative to the base pattern). In addition, the mirror-finished wafer instead of the wafer product 11 is placed at the holder when measuring the fixed pattern noise of the registration measuring apparatus 10 (to be it detailed later)

The illuminating optical system (13~18) comprises a light source 13, an illumination aperture stop 14, a condenser lens 15, a field stop 16, an illumination relay lens 17 and a beam splitter 18, which are disposed sequentially along an optical axis O1. The beam splitter 18, whose reflection/transmission surface 18a is tilted at approximately 45 degrees relative to the optical axis O1, is set over an optical axis O2 of the image forming optical system (19~23) as well. The optical axis O1 of the illuminating optical system (13~18) extends perpendicular to the optical axis O2 of the image forming optical system (19~23).

In addition, the light source 13 emits light with a wide band (such as white light). The illumination aperture stop 14 is used to control the diameter of the light emitted from the light source 13 so as to achieve a specific diameter. The condenser lens 15 condenses the light from the illumination aperture stop 14. The field stop 16, which is an optical element that limits the range of field of the registration measuring apparatus 10, includes a single slit 16a formed as a rectangular opening as shown in FIG. 1B. The illumination relay lens 17 collimates the light from the slit 16a of the field stop 16.

The light emitted from the light source 13 in the illuminating optical system (13~18) described above uniformly illuminates the field stop 16 via the illumination aperture stop 14 and the condenser lens 15. The light having passed through the slit 16a of the field stop 16 is then guided to the beam splitter 18 via the illumination relay lens 17 and is subsequently guided onto the optical axis O2 of the image forming optical system (19~23) after it is reflected at the reflecting/transmitting surface 18a of the beam splitter 18.

The image forming optical system (19~23) comprises a first objective lens 19, a second objective lens 20, a first relay lens 21, an image forming aperture stop 22 and a second relay lens 23, which are disposed sequentially along the optical axis O2. The optical axis O2 of the image forming optical system (19~23) is parallel to the Z direction.

It is to be noted that the beam splitter 18 of the illuminating optical system (13~18) is provided between the first objective lens 19 and the second objective lens 20, whereas a beam splitter 41 of the focal point detection device (41~48) to be detailed later is provided between the second objective lens 20 and the first relay lens 21.

The first objective lens 19 of the image forming optical system (19~23) condenses the illuminating light L1 entering from the beam splitter 18 of the illuminating optical system (13~18). As a result, the wafer product 11 (or the mirror-finished wafer) on the inspection stage 12 is illuminated along the vertical direction by the illuminating light L1 having been transmitted through the first objective lens 19.

It is to be noted that the range of the angle of incidence of the illuminating light L1 entering the wafer product 11 (or the mirror-finished wafer) is determined in conformance to the aperture diameter of the illumination aperture stop 14 of the illuminating optical system (13~18), since the illumination aperture stop 14 are set at a plane that is conjugate with the position of the pupil of the first objective lens 19.

In addition, since the field stop 16 and the wafer product 11 (or the mirror-finished wafer) are set at positions that are conjugate with each other, the area of the surface of the wafer product 11 (or the mirror-finished wafer) corresponding to the slit 16a of the field stop 16 is illuminated with the illuminating light L1. In other words, an image of the slit 16a is projected onto the surface of the wafer product 11 (or the mirror-finished wafer) through the functions of the illumination relay lens 17 and the first objective lens 19.

From the area of the wafer product 11 (or the mirror-finished wafer) irradiated with the illuminating light L1, as described above, reflected light L2 is generated. The reflected light L2 is guided to the first objective lens 19.

The first objective lens 19 collimates the reflected light L2 from the wafer product 11 (or the mirror-finished wafer). The reflected light L2 having been collimated at the first objective lens 19 is then transmitted through the beam splitter 18 and enters the second objective lens 20. The second objective lens 20 condenses the reflected light L2 from the beam splitter 18 onto a primary image forming plane 10a.

The beam splitter 41 of the focal point detection device (41~48) provided at a stage further rearward relative to the primary image forming plane 10a allows part of the reflected light L2 from the second objective lens 20 to be transmitted (L3) and reflects (L4) the remaining light. The light L3 having been transmitted through the beam splitter 41 is guided to the first relay lens 21 in the image forming optical system (19~23).

The first relay lens 21 collimates the light L3 from the beam splitter 41. The image forming aperture stop 22 controls the light from the first relay lens 21 to achieve a specific diameter. The second relay lens 23 re-forms an image on the image-capturing surface (a secondary image forming plane) of the CCD image-capturing element 24 with the light from the image forming aperture stop 22.

Namely, the reflected light L2 from the wafer product 11 (or the mirror-finished wafer) irradiated with the illuminating light L1 is guided to the second objective lens 20 via the first objective lens 19 and the beam splitter 18 and then an image is formed with the light at the primary image forming plane 10a through the functions of the first objective lens 19 and the second objective lens 20.

In addition, the light from the second objective lens 20 is guided to the second relay lens 23 via the beam splitter 41, the first relay lens 21 and the image forming aperture stop 22, and an image is re-formed on the image-capturing surface of the CCD image-capturing element 24 through the functions of the first relay lens 21 and the second relay lens 23.

The CCD image-capturing element 24, which is an area sensor having a plurality of pixels arrayed in a two-dimensional pattern, captures the image (the reflected image) formed with the reflected light L2 from the wafer product 11 (or the mirror-finished wafer) and outputs image signals to the image processing device 25. The image signals indicate the distribution (the brightness distribution) of brightness values at the individual pixels at the image-capturing surface of the CCD image-capturing element 24.

Now, the distribution of the brightness levels indicated by the image signals output from the CCD image-capturing element 24 to the image processing device 25 is explained. Ideally, the brightness distribution in the image signals should indicate the state of the indentations and projections within the part of the area of the wafer product 11 (or the mirror-finished wafer) that is contained in the visual field range (approximately 50 μm) of the registration measuring apparatus 10. However, the fixed pattern noise of the registration measuring apparatus 10 is superimposed on the brightness distribution in the image signals that are actually obtained.

The primary conceivable causes of the fixed pattern noise from the registration measuring apparatus 10 include the following.

Inconsistency in the intensity of the illumination achieved with the illuminating light L1 from the illuminating optical system (13~18)

Inconsistency in the aberration or inconsistency in the transmittance of the image forming optical system (19~23)

Surface defects at various optical components provided on the optical path and inconsistency in the reflectance or inconsistency in the transmittance among the individual optical components (in particular, near the image plane)

Inconsistency in the sensitivity among the individual pixels at the CCD image-capturing element In other words, the combination of the various types of inconsistency (non-uniformity manifesting within the visual field range) causes the fixed pattern noise from the registration measuring apparatus 10.

Thus, the brightness distribution in the image signals on which such fixed pattern noise is superimposed does not accurately indicate the state of the part of the area of the wafer product 11 (or the mirror-finished wafer) that is contained within the visual field range. Accordingly, the fixed pattern noise correction is executed on the image signals output from the CCD image-capturing element 24 to the image processing device 25 in the embodiment.

Namely, as detailed later, when the wafer product 11 is set on the inspection stage 12, the image processing device 25 takes in the image signals provided by the CCD image-capturing element 24 and corrects the image signals based upon the fixed pattern noise, and then registration inspection (an inspection of the state of registration of the resist pattern relative to the base pattern) is executed for the wafer product 11 based upon the distribution of the brightness levels indicated by the corrected image signals.

In addition, as detailed later, the image processing device 25 measures the fixed pattern noise from the registration measuring apparatus 10 based upon the brightness distribution in the image signals provided by the CCD image-capturing element 24 when the mirror-finished wafer is set on the inspection stage 12. Then, it stores the measured fixed pattern noise into the storage device 26 as an apparatus constant.

Next, the focal point detection device (41~48) of the registration measuring apparatus 10 is briefly explained. The focal point detection device (41~48) detects whether or not wafer product 11 (or the mirror-finished wafer) set on the inspection stage 12 is focus matched relative to the image-capturing surface of the CCD image-capturing element 24.

The focal point detection device (41~48) is constituted with the beam splitter 41, a first AF relay lens 42, a plane parallel plate 43, a pupil splitting mirror 44, a second AF relay lens 45, a cylindrical lens 46, an AF sensor 47 and a signal processing unit 48, disposed along an optical axis O3 in this order.

The beam splitter 41 having its reflection/transmission surface tilted at an angle of approximately 45 degrees relative to the optical axis O3 is also present on the optical axis O2 of the image forming optical system (19~23). The optical axis O3 extends perpendicular to the optical axis O2. The AF sensor 47 is a line sensor having a plurality of pixels one-dimensionally arrayed at its image-capturing surface 47a. The cylindrical lens 46 has refractive power which manifests along a direction perpendicular to the direction in which the pixels are arrayed (indicated by A in the figure) at the image-capturing surface 47a of the AF sensor 47.

The light L4 (hereafter referred to as "AF light") reflected at the beam splitter 41 is collimated at the first AF relay lens 42, is transmitted through the plane parallel plate 43 and then enters the pupil splitting mirror 44. An image of the illumination aperture stop 14 at the illuminating optical system (13~18) is formed on the pupil splitting mirror 44. The plane parallel plate 43, which is an optical element provided to adjust the position of the image of the illumination aperture stop 14 to the center of the pupil splitting mirror 44, adopts a mechanism which allows a tilt adjustment.

The AF light having entered the pupil splitting mirror 44 is split into beams to advance along two directions, and then the light advancing in the two directions is condensed in the vicinity of the image-capturing surface 47a of the AF sensor 47. At this time, two light source images are formed at positions distanced from each other along the direction in which the pixels are arrayed (indicated by A in the figure) at the image-capturing surface 47a.

Figure 3A:
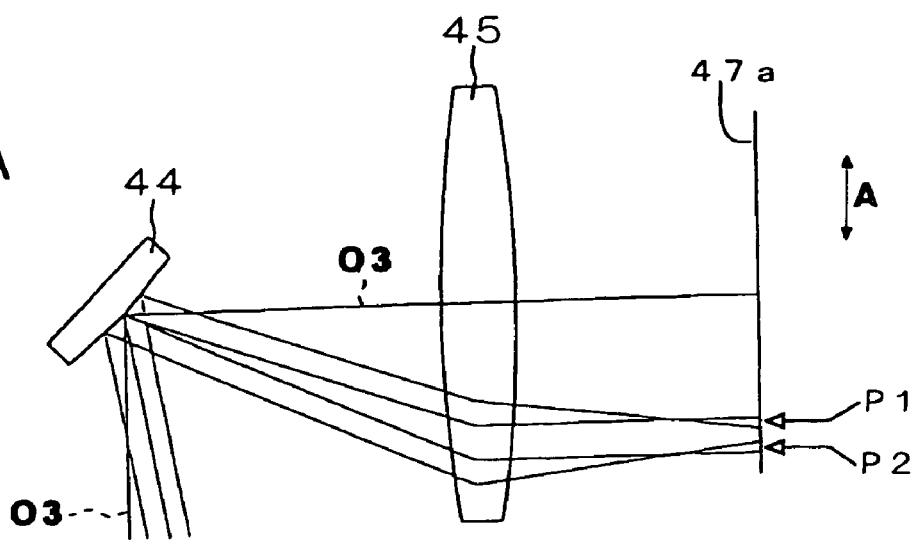
FIGS. 3A~3C illustrate the automatic focusing mechanism in the registration measuring apparatus 10.
Figure 3B:
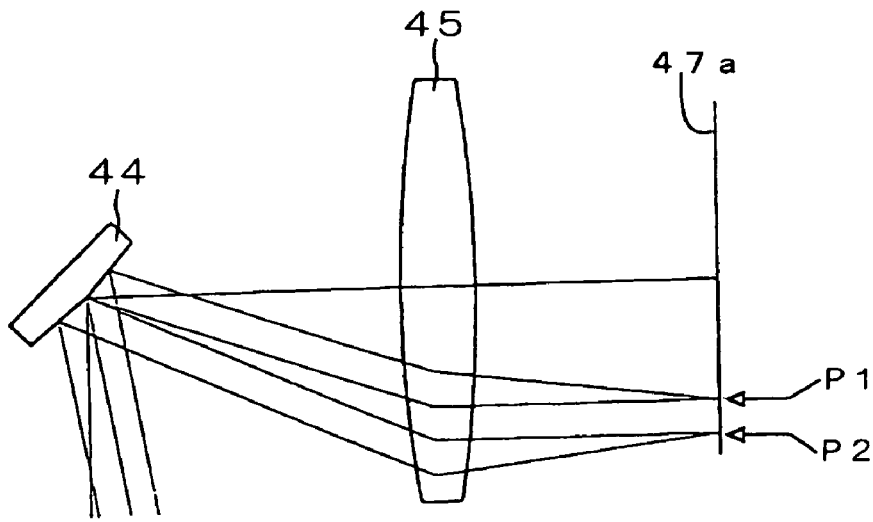
Figure 3C:
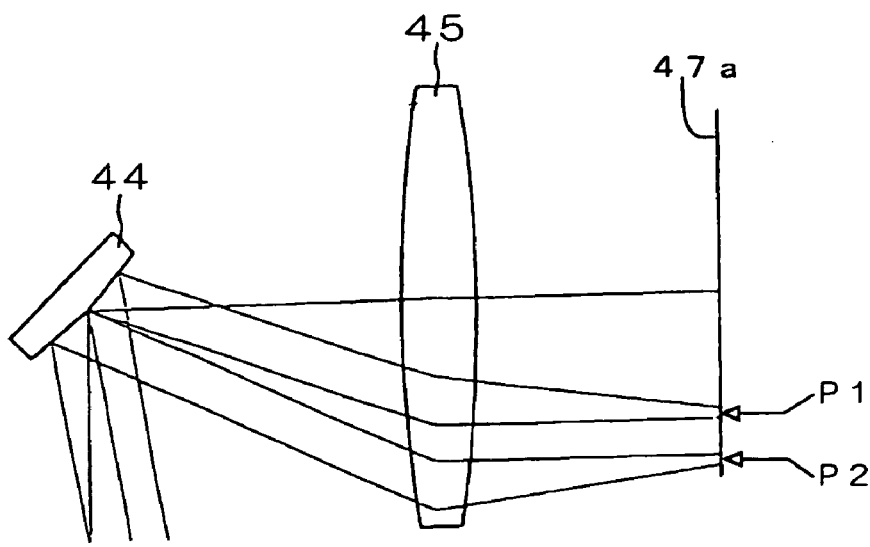

Next, the AF sensor 47 outputs information related to image forming centers P1 and P2 (see FIGS. 3A~3C) of the two light source images formed at the image-capturing surface 47a to the signal processing unit 48 as detection signals. FIGS. 3A, 3B and 3C illustrate varying states of the wafer product 11 (or the mirror-finished wafer) on the inspection stage 12 relative to the CCD image-capturing element 54, i.e., the front focus state, the correct focus state and the rear focus state respectively.

As FIGS. 3A~3C indicate, the image forming centers P1 and P2 of the two light source images are set closer to each other in the front focus state (the wafer is set lower than the position assumed in the correct focus state) and are set further apart from each other in the rear focus state (the wafer is set higher than the position assumed in the correct focus state). In other words, by moving the inspection stage 12 up and down along the Z direction, the image forming centers can be set closer or further apart from each other along the direction in which the pixels are arrayed at the image-capturing surface 47a (indicated by A in the figure)

The signal processing unit 48 calculates the distance between the image-capturing centers P1 and P2 of the two light source images based upon the detection signals provided by the AF sensor 47. At the signal processing unit 48, the distance between the image forming centers P1 and P2 in the correct focus state is stored in memory in advance. Thus, the signal processing unit 48 is able to compare the calculated distance between the image forming centers P1 and P2 and the distance in the correct focus state, calculate the difference between the two distances and output to the stage control device 49 a focus position signal obtained through the calculation.

Lastly, the structure of the stage control device 49 is explained.

The stage control device 49 controls the Z drive unit of the inspection stage 12 based upon the focusing position signal provided by the focal point detection device (41~48) and thus causes the wafer product 11 (or the mirror-finished wafer) to move up/down together with the holder along the Z direction (auto-focusing). As a result, a correct focus state can be achieved for the wafer product 11 (or the mirror-finished wafer) relative to the CCD image-capturing element 24.

In addition, during the registration inspection (the inspection of the state of registration of the resist pattern relative to the base pattern), the stage control device 49 causes the holder (the wafer product 11) to move along the XY directions and positions the registration mark 30 (see FIGS. 2A and 2B) on the wafer product 11 within the visual field range of the registration measuring apparatus 10 by controlling the XY drive unit of the inspection stage 12.

The stage control device 49 also moves the holder (the mirror-finished wafer) along the XY directions and positions a given area of the mirror-finished wafer within the visual field range of the registration measuring apparatus 10 by controlling the XY drive unit of the inspection stage 12 in a manner similar to that described above, when measuring the fixed pattern noise of the registration measuring apparatus 10.

Next, the measurement of the fixed pattern noise from the registration measuring apparatus 10 and the registration inspection for the wafer product 11 are explained in this order.

The fixed pattern noise measurement is executed with the mirror-finished wafer placed on the inspection stage 12 of the registration measuring apparatus 10. By controlling the XY drive unit of the inspection stage 12 with the stage control device 49, as described above, it is ensured that the specific part of the mirror-finished wafer is contained within the full range of the visual field of the registration measuring apparatus 10.

In this state, the image processing device 25 takes in image signals provided by the CCD image-capturing element 24 and measures the fixed pattern noise of the registration measuring apparatus 10 based upon the distribution of the brightness levels indicated by the image signals. The brightness levels indicated by the image signals obtained by using the mirror-finished wafer may be distributed as shown in FIG. 4, for instance.

Figure 4:
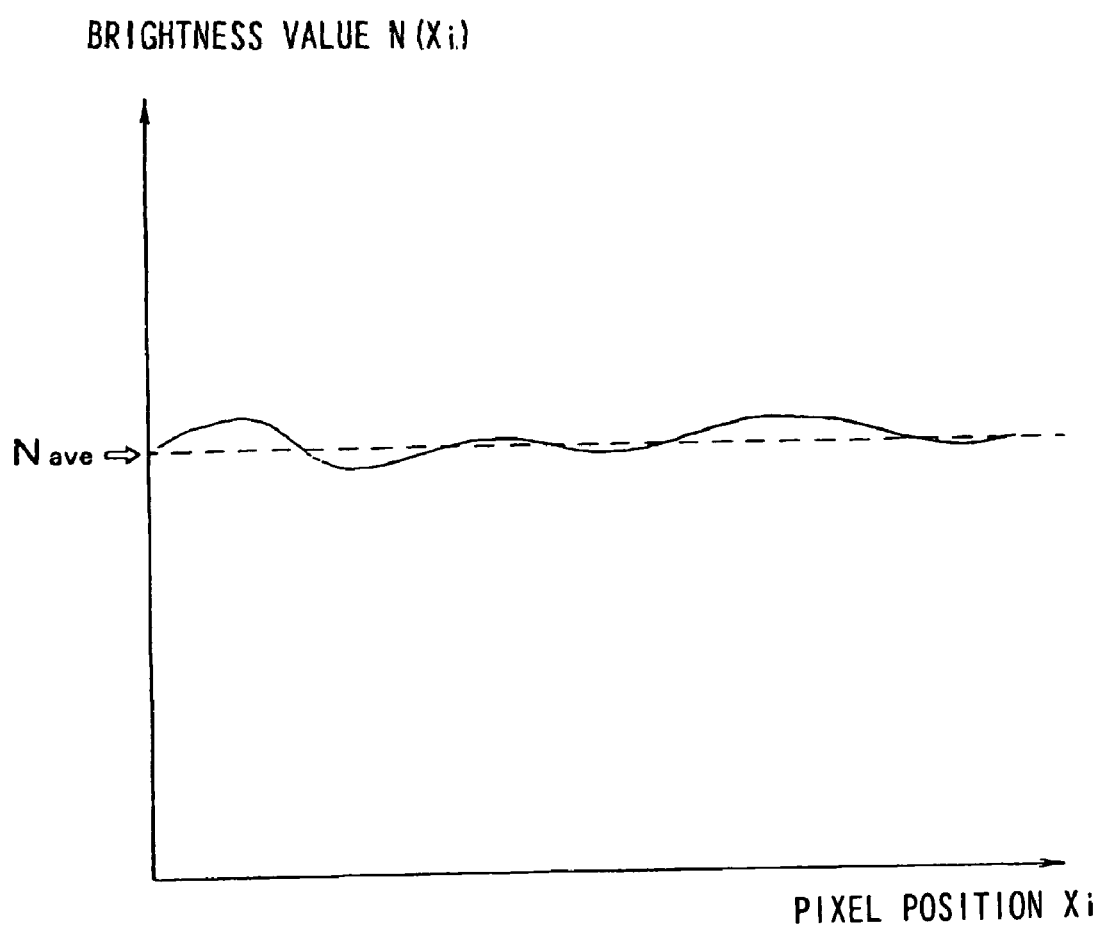
FIG. 4 shows the brightness distribution (i.e., the fixed pattern noise) in image signals taken into the image processing device 25 by using a mirror-finished wafer.

While the image signal brightness distribution is a discrete distribution of the brightness values at the individual pixels at the image-capturing surface of the CCD image-capturing element 24 in reality, the distribution shown in FIG. 4 is represented by a continuous curve for convenience. In addition, while the distribution is actually obtained in the form of two-dimensional image information along the XY directions, FIG. 4 only shows one-dimensional image information corresponding to the X direction to simplify the illustration. In FIG. 4, the position Xi of each pixel is indicated along the horizontal axis and the brightness N(Xi) at each pixel is indicated along the vertical axis.

As has already been explained, since the mirror-finished wafer does not have any indentations or projections at its surface and achieves a uniform reflectance, a brightness distribution indicating a constant brightness value N(Xi) should be ideally obtained regardless of the position Xi of a given pixel. However, the brightness value fluctuates depending upon the pixel position Xi in the distribution of the brightness values indicated by the image signals that are actually obtained, as shown in FIG. 4. This fluctuation is attributed to the superimposed fixed pattern noise of the registration measuring apparatus 10.

Accordingly, the fluctuating component in the distribution of the brightness values (e.g., FIG. 4) indicated by the image signals taken into the image processing device 25 by using the mirror-finished wafer can be regarded to represent the fixed pattern noise of the registration measuring apparatus 10. The image processing device 25 thus stores the results of the measurement, i.e., the fixed pattern noise, into the storage device 26 as an apparatus constant.

In addition, the image processing device 25 calculates corrective brightness data A(Xi) by using a mathematical expression (1) presented below in order to execute a correction by using the fixed pattern noise from the registration measuring apparatus 10 when conducting the registration inspection for the wafer product 11 which is to be explained next.

$$A(Xi)=N\text{ave}-N(Xi) \tag{1}$$

The corrective brightness data A(Xi) are equivalent to the difference between the average brightness value Nave of the brightness values N(Xi) at all the pixels and the brightness value N(Xi) at a given pixel. This difference corresponds to approximately 1~2 gradations when the brightness of the pixel is, for instance, 256 gradation levels. Then, the image processing device 25 stores the corrective brightness data A(Xi) at the storage device 26 as an apparatus constant, as well.

The registration inspection for the wafer product 11 is executed as described below by using the corrective brightness data A(Xi) stored in the storage device 26.

To execute the registration inspection, the wafer product 11 is placed on the inspection stage 12 and the registration mark 30 (see FIGS. 2A and 2B) formed on the wafer product 11 is positioned within the visual field range of the registration measuring apparatus 10.

During this process, the registration mark 30 positioned at a given point within the visual field range is illuminated with the illuminating light L1 and an image of the registration mark 30 is formed on the image-capturing surface of the CCD image-capturing element 24. Then, the image processing device 25 takes in the image signals provided by the CCD image-capturing element 24 in this state.

The brightness distribution in the image signals obtained through the process contains the fixed pattern noise (e.g., the fluctuating component in FIG. 4) of the registration measuring apparatus 10 superimposed on the brightness distribution corresponding to the actual structure of the registration mark 30. In other words, the brightness distribution obtained at this point does not accurately indicate the structure of the registration mark 30. As a result, when the positioning point for the registration mark 30 moves within the visual field range of the registration measuring apparatus 10, the shape of the brightness distribution itself becomes altered due to the fixed pattern noise.

For this reason, the image processing device 25 takes in the image signals constituting the image of the registration mark 30 from the CCD image-capturing element 24 and executes a fixed pattern noise correction on the image signals. In more specific terms, it sequentially calculates the sums of the corrective brightness data A(Xi) stored in the storage device 26 and the brightness values indicated by the image signals constituting the image of the registration mark 30 in correspondence to individual pixels.

Thus, the image processing device 25 generates image signals indicating a brightness distribution accurately reflecting the structure of the registration mark 30 (see FIGS. 2A and 2B) alone by eliminating the fixed pattern noise component attributable to the registration measuring apparatus 10.

Subsequently, the image processing device 25 extracts edge information from the brightness distribution indicated by the corrected image signals. The brightness distribution edge information refers to contrast information manifesting in the image signals in correspondence to the structure of the registration mark 30 at positions at which the brightness value changes drastically in the brightness distribution. The edge information contains a plurality of edges in correspondence to the specific structure of the registration mark 30. During the edge information extraction, the discrete brightness distribution undergoes spline interpolation.

In addition, the image processing device 25 calculates central positions C1 and C2 of the base mark 31 and the resist mark 32 (see FIGS. 2A and 2B) constituting the registration mark 30 respectively, based upon the edge information extracted from the brightness distribution indicated by the image signals (which have been corrected). These central positions C1 and C2 may be calculated through, for instance, a correlational arithmetic operation. It is to be noted that the calculated central positions C1 and C2 are positions indicated in relation to the origin point of a coordinate system set in the visual field range of the registration measuring apparatus 10.

The embodiment, in which the edge information is extracted from the brightness distribution (indicated by the corrected image signals) accurately reflecting the structure of the registration mark 30 alone and the central positions C1 and C2 are calculated based upon the edge information, achieves the following advantages.

Namely, the central positions C1 and C2 can be detected with a high degree of repeatability regardless of the positioning points of the base mark 31 and 32 in the visual field range of the registration measuring apparatus 10. This means that even when the positioning points of the base mark 31 and the resist mark 32 move in the field area, the results of the positional detection do not fluctuate.

Furthermore, the registration inspection (the inspection of the state of registration of the resist pattern relative to the basic pattern) for the wafer product 11 is executed at the image processing device 25 in the registration measuring apparatus 10 in the embodiment. In other words, the image processing device 25 calculates a registration measurement value R (see FIGS. 2A and 2B) as the difference (the extent of offset) between the central positions C1 and C2 of the base mark 31 and the resist mark 32. The registration measurement value R is indicated as a two-dimensional vector at the surface of the wafer product 11.

The registration measurement value R calculated as described above, too, remains constant regardless of the positioning points of the base mark 31 and 32 in the visual field range of the registration measuring apparatus 10 as do the central positions C1 and C2. In other words, the registration measurement value R of the wafer product 11, too, can be detected with a high degree of repeatability, free of the adverse effect of the fixed pattern noise, in the embodiment. Consequently, the reliability of the registration inspection executed for the wafer product 11 improves.

While the stage height of the base mark 31 is becoming increasingly smaller with adoption of CMP (chemical-mechanical polishing) processing or the like, resulting in a reduction in the contrast of the brightness distribution indicated by the image signals taken into the image processing device 25 in recent years, the embodiment effectively addresses this problem introduced by the reduced stage height of the mark.

Namely, when detecting a mark with a low stage, too, the central positions C1 and C2 and the registration measurement value R can be detected with good repeatability without being affected by the fixed pattern noise of the registration measuring apparatus 10.

It is to be noted that while the fixed pattern noise is corrected by using the corrective brightness data A(Xi) defined in mathematical expression (1) when detecting the central positions C1 and C2 of the base mark 31 and the resist mark 32 and the registration measurement value R in the embodiment described above, the present invention is not limited to this example. For instance, corrective brightness data B(Xi) calculated by using mathematical expression (2) below may be used instead.

$$B(Xi)=\text{Nave}/N(Xi) \quad (2)$$

The corrective brightness data B(Xi) are equivalent to the ratio of the average brightness value Nave of the brightness values N(Xi) at all the pixels and the brightness value N(Xi) at a given pixel. These corrective brightness data B(Xi), too, should be stored into the storage device 26 as an apparatus constant to be referenced during the registration inspection for the wafer product 11.

The fixed pattern noise is corrected by using the corrective brightness data B(Xi) through processing in which the brightness values of the image signals constituting the image of the registration mark 30 are multiplied with the corresponding corrective brightness data B(Xi) stored in the storage device 26 for a single pixel at a time. In this case, too, the central positions C1 and C2 of the base mark 31 and the resist mark 32 and the registration measurement value R can be detected with good repeatability which is comparable to that achieved when the corrective brightness data A(Xi) are used.

In addition, the corrective brightness data A(Xi) and the corrective brightness data B(Xi) may be used in combination, or a plurality of types of corrective brightness data may be prepared in advance and a specific type of corrective brightness data may be selectively used in correspondence to the average brightness value of the image signals obtained by using the wafer product 11 instead.

Furthermore, the fixed pattern noise of the registration measuring apparatus 10 may be corrected in a method other than those adopted in the two examples described above. For instance, the brightness distribution (N(Xi)) of the image signals taken into the image processing device 25 by using the mirror-finished wafer may be directly used to correct the fixed pattern noise contained in the brightness values individually for a single pixel at a time.

Also, while the fixed pattern noise in the image signals obtained by using the wafer product 11 is corrected and the edge information is extracted from the corrected image signals in the embodiment described above, the procedural timing is not limited to this example. The fixed pattern noise correction may be executed with any other timing to achieve a similar improvement in the repeatability by detecting the central positions C1 and C2 and the registration measurement value R based upon the image signals and the fixed pattern noise manifesting when the wafer product 11 is used.

Moreover, while the fixed pattern noise is corrected and the registration measurement value R is detected by the image processing device 25 in the registration measuring apparatus 10 in the embodiment described above, similar operations may be executed by using an external computer connected to the registration measuring apparatus 10.

While the present invention is adopted in the registration measuring apparatus 10 in the embodiment explained above, the present invention is not limited to this application. For instance, it may be adopted in a device (the alignment system of an exposure apparatus) that aligns a mask with the wafer product 11 prior to the exposure step in which a circuit pattern formed at the mask is imprinted onto the resist film. In this case, the position of an alignment mark formed on the wafer product 11 can be detected with a high degree of repeatability. The present invention may also be adopted in an apparatus that detects an optical misalignment occurring between a single inspection mark and a camera reference position.

Furthermore, while the fixed pattern noise of the apparatus is measured by using a mirror-finished wafer in the embodiment described above, a reflecting mirror instead of the mirror-finished wafer may be used. Also, even when the surface reflectance does not achieve a uniform distribution, the fixed pattern noise can be measured with comparable accuracy as long as the reflection characteristics are known. If any adherence such as dust or dirt is present at the surface of the mirror-finished wafer or the reflecting mirror, it is desirable to visually inspect for an area where no such adherence is present and take in image signals for the fixed pattern noise measurement from the clean area.

By utilizing the registration measuring apparatus 10 achieved in the embodiment during semiconductor manufacturing processes, highly accurate registration inspection and alignment can be achieved when manufacturing semiconductors, which is bound to improve the product yield.

It is to be noted that while an explanation is given above in reference to the embodiment on an example in which the present invention is adopted in the mark position detection executed during a semiconductor manufacturing process, the present invention is not limited to this application. The mark position detecting apparatus according to the present invention may be utilized in all types of situations that necessitate a highly accurate detection of a mark position.

The above described embodiment is an example, and various modifications can be made without departing from the spirit and scope of the invention.

What is claimed is:

1. A mark position detection apparatus, comprising:
    an illumination unit that illuminates a substrate having a mark formed thereupon;
    an image-capturing unit that captures an image of the substrate by using reflected light from the substrate and outputs image signals;
    a storage unit at which information related to fixed pattern noise contained in the image signals output by the image-capturing unit is stored in memory; and
    a control unit that calculates a position of the mark on the substrate based upon the information related to the fixed pattern noise stored in memory at the storage unit and the image signals outputted from the image-capturing unit.

2. A mark position detecting apparatus according to claim 1, wherein:
    the information related to the fixed pattern noise is obtained from a reference membr having known reflection characteristics, and the control unit measures the fixed pattern noise by using the reference member having the known reflection characteristics, the illumination unit, and the image-capturing unit, and the control unit stores the information related to the fixed pattern noise into the storage unit.

3. A mark position detecting apparatus according to claim 1, wherein:
    the control unit corrects the image signals based upon the information related to the fixed pattern noise and calculates the position of the mark based upon edge information in a brightness distribution indicated by the corrected image signals.

4. A mark position detecting apparatus according to claim 2, wherein:
    the image-capturing unit includes an image-capturing element comprising a plurality of pixels; and
    the control unit obtains average brightness information indicating an average brightness among substantially all the pixels and brightness information at the individual pixels based upon image signals generated by capturing an image of the reference member generates corrective brightness information for the individual pixels based upon the average brightness information and the brightness information corresponding to the individual pixels thus obtained, stores the corrective brightness information thus generated for the individual pixels into the storage unit as the information related to the fixed pattern noise and corrects brightness information corresponding to the individual pixels indicated by the image signals obtained when the image of the substrate having the mark formed thereupon is captured by using the corrective brightness information for the individual pixels stored at the storage unit.

5. A mark position detecting apparatus according to claim 2, wherein:
    the reference member is a mirror-finished wafer.

6. A mark position detecting method, comprising:
    an illumination step in which a substrate having a mark formed thereupon is illuminated;
    an image-capturing step in which an image of the substrate is captured by using reflected light from the substrate and image signals are output; and
    a calculation step in which a position of the mark on the substrate is calculated based upon information related to fixed pattern noise contained in the image signals stored in memory in advance at a storage unit and the image signals outputted from the image-capturing unit.

7. A mark position detecting method according to claim 6, further comprising:
    obtaining information related to the fixed pattern noise from a reference member having known reflection characteristics, a measurement step in which the fixed pattern noise is measured by using the reference member having the known reflection characteristics, an illumination unit utilized in the illumination step and an image-capturing unit utilized in the image-capturing step and storing the information related to the fixed pattern noise into the storage unit.

8. A mark position detecting method according to claim 6, wherein:

during the calculation step, the image signals are corrected based upon the information related to the fixed pattern noise and the position of the mark is calculated based upon edge information in a brightness distribution indicated by the corrected image signals.

9. A mark position detecting method according to claim 7, wherein:

the image-capturing unit includes an image-capturing element comprising a plurality of pixels;

during the measurement step, average brightness information indicating an average brightness among substantially all the pixels and brightness information corresponding to the individual pixels are obtained based upon image signals generated by capturing an image of the reference member, corrective brightness information is generated for the individual pixels based upon the average brightness information and the brightness information corresponding to the individual pixels thus obtained and the corrective brightness information for the individual pixels thus generated is stored into the storage unit as the information related to the fixed pattern noise; and during the calculation step, brightness information at the individual pixels indicated by the image signals obtained when the image of the substrate having the mark formed thereupon is captured is corrected by using the corrective brightness information for the individual pixels stored in the storage unit.

10. A mark position detecting method according to claim 7, wherein:

the reference member is a mirror-finished wafer.

* * * * *